United States Patent [19]

Albers et al.

[11] 4,434,987

[45] Mar. 6, 1984

[54] SHAFT SEAL WITH MAGNETICALLY CONTROLLED GAP BETWEEN ROTATING RING AND SURROUNDING NON-ROTATING RING

[75] Inventors: Rolf Albers, Oberhausen; Emil Aschenbruck, Duisburg; Günter Neuhaus; Joachim Kotzur, both of Oberhausen, all of Fed. Rep. of Germany

[73] Assignee: M.A.N. Maschinenfabrik Augsburg-Nürnberg Aktiengesellschaft, Fed. Rep. of Germany

[21] Appl. No.: 506,349

[22] Filed: Jun. 21, 1983

[30] Foreign Application Priority Data

Jun. 25, 1982 [DE] Fed. Rep. of Germany ....... 3223744

[51] Int. Cl.$^3$ .............................................. F16J 15/54
[52] U.S. Cl. ........................................ 277/80; 277/38; 277/81 R; 277/901; 277/28
[58] Field of Search .................... 277/1, 65, 38–41, 277/28, 29, 80, 81 R, 83, 173–177, 901

[56] References Cited

U.S. PATENT DOCUMENTS 3,025,070 3/1962 Copes ..................................... 277/39
3,170,409 2/1965 McLeod et al. ................... 277/80 X
3,708,177 1/1973 Baermann ............................ 277/80

FOREIGN PATENT DOCUMENTS 141821 4/1920 United Kingdom ................. 277/80
222085 10/1968 U.S.S.R. ............................... 277/80

Primary Examiner—Robert S. Ward
Attorney, Agent, or Firm—McGlew and Tuttle

[57] ABSTRACT

A seal device for a shaft rotating with respect to a housing comprises a rotating seal ring having opposite radial side surfaces and a circumferential end surface. The rotating seal ring is connected for co-rotation with the shaft. A non-rotating seal ring is non-rotatably connected to the housing over a yielding packing element and surrounds at least a portion of the rotating seal ring to define axial plane sealing gaps and an annular circumferential gap. Sealing fluid is pumped to each gap over bores communicating with the radial plane gaps. An electromagnet is connected to the housing and attracts or repels magnetic material in a radially extending portion of the non-rotating seal ring for regulating the width of each radial plane gap. Electromagnet is connected over a control unit to a sensor for sensing each gap, to maintain a selected gap width for each gap by regulating the activation of the electromagnet. The non-rotating seal ring is also slidable within a smooth sleeve connected to the housing.

7 Claims, 1 Drawing Figure

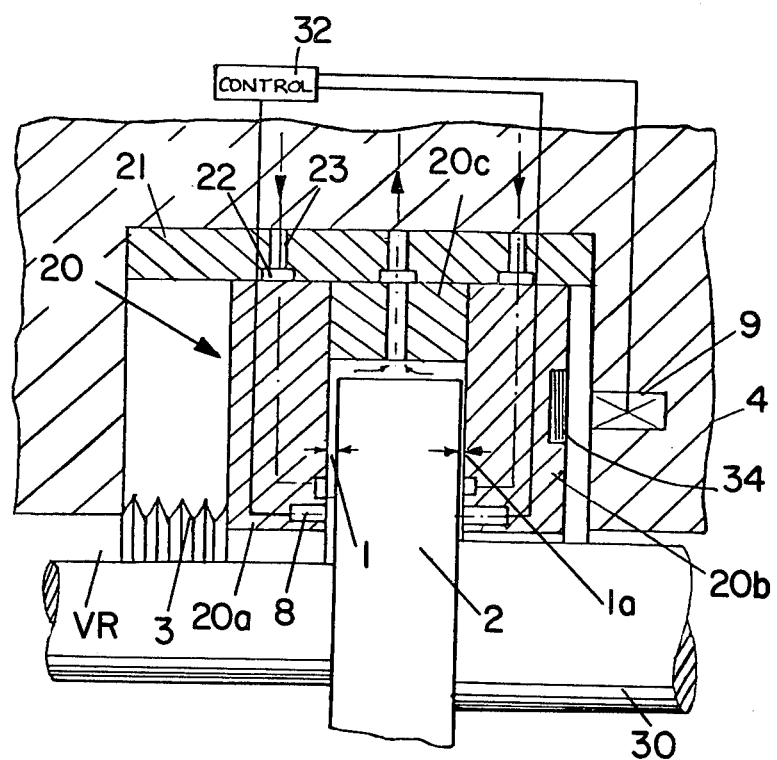

SHAFT SEAL WITH MAGNETICALLY CONTROLLED GAP BETWEEN ROTATING RING AND SURROUNDING NON-ROTATING RING

FIELD AND BACKGROUND OF THE INVENTION

The present invention relates in general to shaft seals, and in particular to a new and useful sealing arrangement which utilizes a first seal ring connected to and rotating with a shaft, which is surrounded on its radially extending and circumferentially extending surfaces, by a non-rotating seal ring connected to a housing.

A shaft seal according to co-pending U.S. patent application Ser. No. 500,160 filed June 1, 1983 entitled SHAFT SEAL WITH POSITIVELY MAGNETICALLY CONTROLLED SEAL GAP (German patent application No. P 32 21 380.8-12) operates to maintain a narrow sealing gap at all speeds and independently of the pressure of the sealing fluid, so that the fluid leakage is small. This co-pending application is incorporated here by reference.

In such a design, the sealing gap is formed preferably between one of the front sides of a rotating seal ring and an associated non-rotating seal ring, and is kept constant by means of electronically controlled electromagnets. With the use of two different sealing fluids or with a sealing fluid pressure graduation, a sealing gap may be provided at either front side of the rotating seal ring. Such a double seal then comprises two complete sealing systems which require a considerable space and an electronic control which is very expensive.

SUMMARY OF THE INVENTION

The present invention is directed to a development of such a shaft seal in which, while maintaining the arrangement with sealing gaps kept constant at either front side of the non-rotating seal ring, and with a selective use of different sealing fluids, the dimensions of the shaft seal and the control costs are reduced.

Accordingly, an object of the present invention is to provide a seal device for a shaft rotating with respect to a housing, comprising, a rotating seal ring having opposite radially extending side surfaces and a circumferentially extending end surface, and connected to the shaft for co-rotation therewith, a non-rotating seal ring non-rotatably associated with the housing, surrounding at least a portion of the rotating seal ring and defining a pair of radial plane seal gaps with said side surfaces and a circumferential gap with said end surface with a packing element which is elastically yieldable in all directions, connected between the housing and said non-rotating seal ring for permitting relative motion therebetween to vary a width of the gaps. Sealing fluid means are provided for supplying a sealing fluid to each gap, with fluid being supplied over at least supply bore communicating with each gap. The non-rotating seal ring has a radially extending portion with magnetically attractable material connected thereto. An electromagnet connected to the housing on a side of the radially extending portion and adjacent the magnetically attractable material exerts a force on the material. A sensor is provided for sensing each gap and connected to control means, which is also connected to the electromagnet, for regulating the force of the electromagnet to maintain selected gap widths for each radial plane gap.

The advantage thereby obtained is that the non-rotating seal ring can be moved by a single electronically controlled magnetic system. This saves space and one complete control system, as compared to the mentioned co-pending application.

According to a development of the invention, the non-rotating seal ring may comprise two front rings carrying the sensors, and a circumferential ring by which the front rings are rigidly connected to each other.

Under normal operating conditions, the non-rotating seal ring is held in its position radially in the same way as disclosed in the above-mentioned U.S. application (German patent application No. P 32 21 380.8-12). In some instances, however, it may be advisable to provide a fixed radial guidance. This may be done by mounting the non-rotating seal ring for axial displacement in a radially guiding sleeve, with a high quality finish of the surfaces which slide on each other. The guiding sleeve may be designed with transverse bores opening into inner circular channels, for supplying and/or discharging the sealing fluid.

In such a design, one bore may be provided for supplying the sealing fluid to both sealing gaps, or separate bores may be provided for each of the sealing gaps if different sealing fluids are employed. One of the bores may be used for discharging the sealing fluid. Because of the snug sliding fit between the guiding sleeve and the non-rotating seal ring, no sealing fluid leaks at that location in practice.

In another embodiment of the invention, the electromagnets mounted in the housing of the seal, and the yielding packing element may be provided opposite each other, at the opposite front sides of the non-rotating seal ring. The yielding packing element provided between the housing and the non-rotating seal ring seals the shaft seal against the working space of the machine to which the shaft is associated. Therefore, the electromagnets which are distributed over the circumference of the non-rotating seal ring at the opposite side are not exposed to the fluid present in the working space. This is advantageous particularly if the working fluid is aggressive.

Pulses electronically transmitted from the gap measuring sensors in the two front rings are received at the electromagnets. The non-rotating ring is thus controlled to continuously adjust an identical width of the gaps at either side, i.e. to ensure that the rotating seal ring will rotate symmetrically within the enclosing non-rotating one.

Another object of the invention is to provide a seal device which is simple in design, rugged in construction and economical to manufacture.

The various features of novelty which characterize the invention are pointed out with particularlity in the claims annexed to and forming a part of this disclosure. For a better understanding of the invention, its operating advantages and specific objects attained by its uses, reference is made to the accompamying drawing and descriptive matter in which a preferred embodiment of the invention is illustrated.

BRIEF DESCRIPTION OF THE DRAWING

The only FIGURE of the drawing is a sectional view of the shaft seal device in accordance with the invention.

DESCRIPTION OF THE PREFERRED EMBODIMENT

Referring to the drawing in particular, the invention embodied therein comprises a seal device for a rotating shaft 30 rotatable with respect to a housing 4.

Seal ring 2 is fixed to and rotates with the shaft 30. Both radially extending sides or surfaces of ring 2 as well as its circumferential surface are surrounded by a non-rotating seal ring 20 comprising two front or side rings 20a and 20b. The clearance between front rings 20a and 20b is wider than the width of seal ring 2 rotating therebetween, by gaps 1, 1a provided at either front side of rotating seal ring 2. Front rings 20a, 20b are rigidly connected to each other by a circumferential ring 20c. A guide sleeve 21 is provided in the housing 4 of the seal, for positioning non-rotating seal ring 20 radially. The sealing fluid is supplied and discharged through bores 23 traversing sleeve 21 and opening into circular or annular channels 22 provided in the inside surface of sleeve 21. Sensors 8 for measuring the sealing gaps are embedded in front rings 20a, 20b of non-rotating seal ring 20. The pulses produced by sensors 8 are electronically transmitted to electromagnets 9 by which the widths of gaps 1, 1a are kept constant. Control means 32 is provided for this purpose. Electromagnets 9 are provided on the front surface facing non-rotating seal ring 20 of housing 4 and remote from a yielding packing element 3 by which seal ring 20 is connected to the housing at its oppposite side and thus separated from the working space VR of the machine to which shaft 30 is connected. The machine is not shown.

Packing element 3 is yieldable in all directions to permit any variation of the gaps 1, 1a, as well as the circumferentially extending end gap defined between circumferential ring 20c and the outer circumferential surface of rotating seal ring 2.

While one elemectromagnet 9 is shown, a plurality of such magnets can be provided circumferentially around the housing. The magnet or magnets cooperate with magnetically attractable material 34 which is embedded in a radially extending portion of non-rotating seal ring 20.

Sleeve 21 and the outer circumferential surfaces of each of the individual rings making up non-rotating seal ring 20, are smooth for permitting easy axial relative movement between the ring and the sleeve.

While a specific embodiment of the invention has been shown and described in detail to illustrate the application of the principles of the invention, it will be understood that the invention may be embodied otherwise without departing from such principles.

What is claimed is:

1. A seal device for a shaft rotating with respect to a housing, comprising:
    a rotating seal ring having opposite radially extending side surfaces and a circumferentially extending end surface, said rotating seal ring connected to the shaft for co-rotation therewith;
    a non-rotating seal ring non-rotatably associated with the housing, surrounding at least a portion of said rotating seal ring and defining a pair of radial plane sealing gaps with said side surfaces of said rotating seal ring and a circumferential gap with said end surface of said rotating seal ring, said non-rotating seal ring having a radially extending portion with magnetically attractable material connected thereto;
    a packing element which is elastically yieldable in all directions, connected between said housing and said non-rotating seal ring for permitting relative motion therebetween to vary a width of each gap;
    sealing fluid means for supplying a sealing fluid to the gaps, said sealing fluid means supplying sealing fluid over at least one supply bore communicating with each radial plane gap;
    an electromagnet connected to the housing on a side of said radially extending portion and adjacent said magnetically attractable material for exerting a magnetic force on said non-rotating seal ring through said magnetically attractable material;
    a sensor connected to said non-rotating seal ring for sensing a width of each radial plane gap; and
    control means connected to each sensor and said electromagnet for activating said electromagnet in response to each sensor for applying a selected magnetic force to maintain a selected width for each radial plane gap.

2. A device according to claim 1, wherein said non-rotating seal ring comprises a pair of side rings, each defining one of said radial plane gaps with said rotating seal ring, each side ring having a recess for receiving one of said sensors, each recess facing said rotating seal ring, and a circumferential ring fixed between said side rings and defining said end surface with said rotating seal ring.

3. A device according to claim 2, including a guide sleeve having a smooth axially extending inner surface fixed to the housing, said non-rotating seal ring having a smooth outer circumferential surface in sliding engagement with said inner surface of said guide sleeve for axially guiding said non-rotating seal ring in the housing.

4. A device according to the claim 3, wherein said guide sleeves includes a circumferential annular channel extending over a portion of each of said side rings and said circumferential ring and forming a portion of said fluid means, each of said side and circumferential rings including a bore for sealing fluid communicating with a respective one of said annular channels.

5. A device according to claim 1, including a guide sleeve having a smooth axially extending inner surface fixed to the housing, said non-rotating seal ring having a smooth outer circumferential surface in sliding engagement with said inner surface of said guide sleeve for axially guiding said non-rotating seal ring in the housing.

6. A device according to claim 5, wherein said guide sleeve includes at least one inner annular channel communicating with said at least one supply bore.

7. A device according to claim 1, wherein said electromagnet is positioned on a side of said rotating seal ring opposite from said packing element.

* * * * *